United States Patent
Zhang et al.

(10) Patent No.: US 9,661,109 B2
(45) Date of Patent: May 23, 2017

(54) SYSTEMS AND METHODS FOR DATA MIGRATION

(71) Applicant: Tencent Technology (Shenzhen) Company Limited, Shenzhen (CN)

(72) Inventors: Zhenlian Zhang, Shenzhen (CN); Bo Li, Shenzhen (CN); Jinkun Hou, Shenzhen (CN); Junxiong Chen, Shenzhen (CN); Xiaoqin He, Shenzhen (CN); Zheng Liu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 138 days.

(21) Appl. No.: 14/594,337

(22) Filed: Jan. 12, 2015

(65) Prior Publication Data
US 2015/0146717 A1  May 28, 2015

Related U.S. Application Data

(63) Continuation of application No. PCT/CN2014/081904, filed on Jul. 9, 2014.

(30) Foreign Application Priority Data

Nov. 25, 2013 (CN) .......................... 2013 1 0603825

(51) Int. Cl.
*H04L 29/06* (2006.01)
(52) U.S. Cl.
CPC .............. *H04L 69/22* (2013.01); *H04L 69/08* (2013.01)
(58) Field of Classification Search
CPC ................................ H04L 60/08; H04L 60/22
(Continued)

(56) References Cited

U.S. PATENT DOCUMENTS 6,151,608 A * 11/2000 Abrams ................ G06F 17/303
707/679
2001/0053156 A1* 12/2001 Higuchi .................. H04L 12/18
370/466
(Continued)

FOREIGN PATENT DOCUMENTS

CN        1763745 A     4/2006
CN      102063500 A     5/2011
(Continued)

OTHER PUBLICATIONS

Fiuczynski, Marc. "The Design and Implementation of an IPv6/IPv4 Network Address and Protocol Translator" Proceesings of the USENIX Annual Technical Conference. Jun. 1998.*

(Continued)

*Primary Examiner* — Stephen J Clawson
(74) *Attorney, Agent, or Firm* — Jones Day

(57) ABSTRACT

Systems and methods are provided for data migration. For example, a data packet of a first platform is acquired; the data packet is parsed to obtain one or more data structure fields of the data packet; the data structure fields of the data packet are matched with a predetermined first field mapping table; in response to the data structure fields of the data packet being matched with the predetermined first field mapping table, the data packet is associated with a second platform based at least in part on one or more predetermined association rules; the data packet is converted based at least in part on the association of the data packet and the second platform; and the converted data packet is migrated to the second platform.

22 Claims, 11 Drawing Sheets

(58) Field of Classification Search
USPC .......................................................... 370/389
See application file for complete search history.

(56)     References Cited

U.S. PATENT DOCUMENTS

| | | |
|---|---|---|
| 2005/0149536 A1 | 7/2005 | Wildes et al. |
| 2006/0064466 A1* | 3/2006 | Shiga ................. H04L 67/1097 709/214 |
| 2008/0082547 A1* | 4/2008 | Hwang ................. G06Q 10/10 |
| 2010/0153341 A1* | 6/2010 | Driesen ................ G06F 17/303 707/661 |

FOREIGN PATENT DOCUMENTS

| | | |
|---|---|---|
| CN | 102110102 A | 6/2011 |
| CN | 102308297 A | 1/2012 |
| CN | 102970328 A | 3/2013 |
| TW | 201118773 A | 6/2011 |

OTHER PUBLICATIONS

Taiwan Patent Office, Office Action dated Jan. 29, 2016, in Application No. 103140226.
Patent Cooperation Treaty, International Search Report and Written Opinion of the International Searching Authority, PCT/CN20104/081904, mailed Oct. 10, 2014.
Patent Cooperation Treaty, International Preliminary Report on Patentability, issued May 31, 2016, in PCT/CN2014/081904.

* cited by examiner

Please choose a category corresponding to the commodities below.

1. choose a commodity

| Enter the name of the commodity | Search | View all commodities |

| | |
|---|---|
| 1 | Commodity name display area |
| 2 | Commodity name display area |
| 3 | Commodity name display area |
| 4 | Commodity name display area |
| 5 | Commodity name display area |
| 6 | Commodity name display area |
| 7 | Commodity name display area |
| 8 | Commodity name display area |

2. choose a category

Original category of Data packet: parent category name>child category name

Recommended category  parent category name>child category name

Common category

Shop category

All category

Commodities with corresponding categories: 10/50

| Confirm conversion | Skip | Close |

Figure 3(B)

SYSTEMS AND METHODS FOR DATA MIGRATION

CROSS-REFERENCES TO RELATED APPLICATIONS

This application is a continuation of International Application No. PCT/CN2014/081904, with an international filing date of Jul. 9, 2014, now pending, which claims priority to Chinese Patent Application No. 201310603825.8, filed Nov. 25, 2013, both applications being incorporated by reference herein for all purposes.

BACKGROUND OF THE INVENTION

Certain embodiments of the present invention are directed to computer technology. More particularly, some embodiments of the invention provide systems and methods for data processing. Merely by way of example, some embodiments of the invention have been applied to data migration. But it would be recognized that the invention has a much broader range of applicability.

It is possible to introduce a data packet from one platform to another when the two platforms have a same data structure and same field values. However, various E-commerce platforms often have different data structures, different category structures and property structures, which make it difficult to smoothly introduce data packets among different platforms.

Currently, when two platforms have different data structures and field values, data introduction often needs a large amount of manual operations in order to achieve data association and data introduction, which results in a high cost related to user operations and low efficiency. It is usually difficult to achieve intelligent data introduction.

Hence it is highly desirable to improve the techniques for data migration.

BRIEF SUMMARY OF THE INVENTION

According to one embodiment, a method is provided for data migration. For example, a data packet of a first platform is acquired; the data packet is parsed to obtain one or more data structure fields of the data packet; the data structure fields of the data packet are matched with a predetermined first field mapping table; in response to the data structure fields of the data packet being matched with the predetermined first field mapping table, the data packet is associated with a second platform based at least in part on one or more predetermined association rules; the data packet is converted based at least in part on the association of the data packet and the second platform; and the converted data packet is migrated to the second platform.

According to another embodiment, a device for data migration includes: an acquisition module configured to acquire a data packet of a first platform; a parsing module configured to parse the data packet to obtain one or more data structure fields of the data packet; a matching module configured to match the data structure fields of the data packet with a predetermined first field mapping table; an associating module configured to, in response to the data structure fields of the data packet being matched with the predetermined first field mapping table, associate the data packet with a second platform based at least in part on one or more predetermined association rules; and a conversion-and-migration module configured to convert the data packet based at least in part on the association of the data packet and the second platform and migrate the converted data packet to the second platform.

According to yet another embodiment, a non-transitory computer readable storage medium includes programming instructions for data migration. The programming instructions are configured to cause one or more data processors to execute certain operations. For example, a data packet of a first platform is acquired; the data packet is parsed to obtain one or more data structure fields of the data packet; the data structure fields of the data packet are matched with a predetermined first field mapping table; in response to the data structure fields of the data packet being matched with the predetermined first field mapping table, the data packet is associated with a second platform based at least in part on one or more predetermined association rules; the data packet is converted based at least in part on the association of the data packet and the second platform; and the converted data packet is migrated to the second platform.

For example, the devices and methods disclosed herein are configured for the migration of data packets between different platforms, e.g., the data migration of data packets of commodities between different E-commerce platforms. Various E-commerce platforms have different data structure, category structures and property structures. In addition, the category structures determine the property structures, forming a hierarchy. Different data structures, category structures and property structures of two different platforms are taken into consideration in order to migrate the commodity data packets between the two different platforms. As an example, the devices and methods disclosed herein are configured to adopt one or more methods, such as similarity matching, data modeling and user operation memory for intelligently handling migration of commodity data between different fields when the data structures, category structures and property structures of different platforms are different, so as to improve the efficiency of data migration and reduce user operation costs.

Depending upon embodiment, one or more benefits may be achieved. These benefits and various additional objects, features and advantages of the present invention can be fully appreciated with reference to the detailed description and accompanying drawings that follow.

BRIEF DESCRIPTION OF THE DRAWINGS

FIG. 3(B) is a simplified diagram showing an interface for data migration according to one embodiment of the present invention.

DETAILED DESCRIPTION OF THE INVENTION

Figure 1:
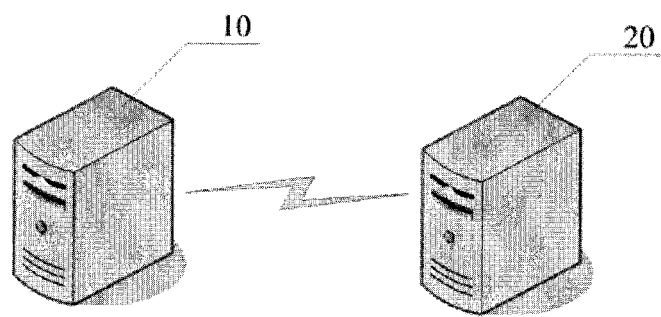
FIG. 1 is a simplified diagram showing a hardware environment for data migration according to one embodiment of the present invention.

FIG. 1 is a simplified diagram showing a hardware environment for data migration according to one embodiment of the present invention. The diagram is merely an example, which should not unduly limit the scope of the claims. One of ordinary skill in the art would recognize many variations, alternatives, and modifications.

According to one embodiment, the hardware environment includes a plurality of platforms. For example, data structures, category structures and property structures of a first platform 10 and a second platform 20 are different, and smooth migration of commodity data between different fields related to the first platform 10 and the second platform 20. In another example, a first platform 10 and a second platform 20 are interconnected through a communication network. The two platforms may be of a same type, e.g. E-commerce platforms, in some embodiments. As an example, a user presently uses the second platform 20, and needs to migrate data from the first platform 10 to the second platform 20.

Figure 2:
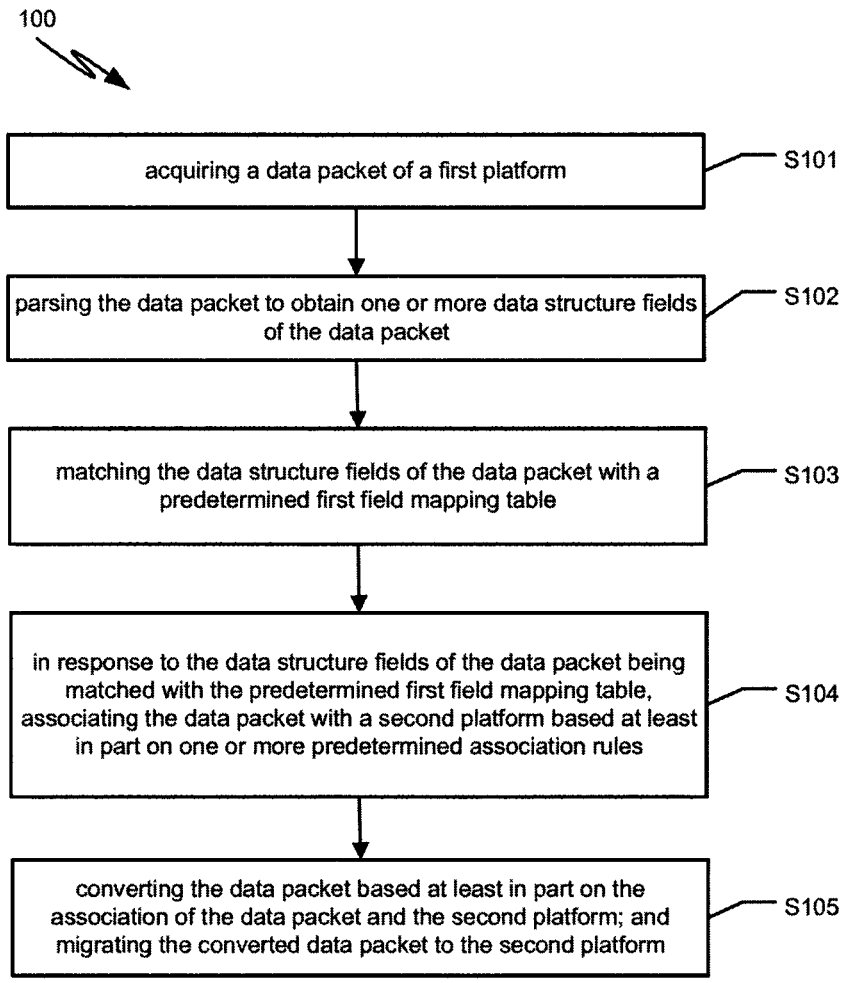
FIG. 2 is a simplified diagram showing a method for data migration according to one embodiment of the present invention.

FIG. 2 is a simplified diagram showing a method for data migration according to one embodiment of the present invention. The diagram is merely an example, which should not unduly limit the scope of the claims. One of ordinary skill in the art would recognize many variations, alternatives, and modifications. The method 100 includes at least the processes S101-S105.

According to one embodiment, the process S101 includes acquiring a data packet of a first platform. For example, the data packet of the first platform is uploaded onto the second platform on which the user is operating presently. The data packet of the first platform can be directly selected and acquired from the first platform or from the background server. As an example, the process S102 includes parsing the data packet to obtain a data structure field of the data packet.

According to another embodiment, the process S103 includes matching the data structure field of the data packet with a predetermined first field mapping table. The data structure, as in an E-commerce platform, may include a category field, a name field and/or other suitable information of the commodity. For instance, a data structure can include certain data structure fields, such as category name, commodity name and commodity price. As an example, different platforms may have different data structure fields, and the mapping between the commodity data structure fields of the first platform and the second platform is configured in advance. The first field mapping table is hence created, as shown in FIG. 3(A), according to certain embodiments.

Figure 3A:
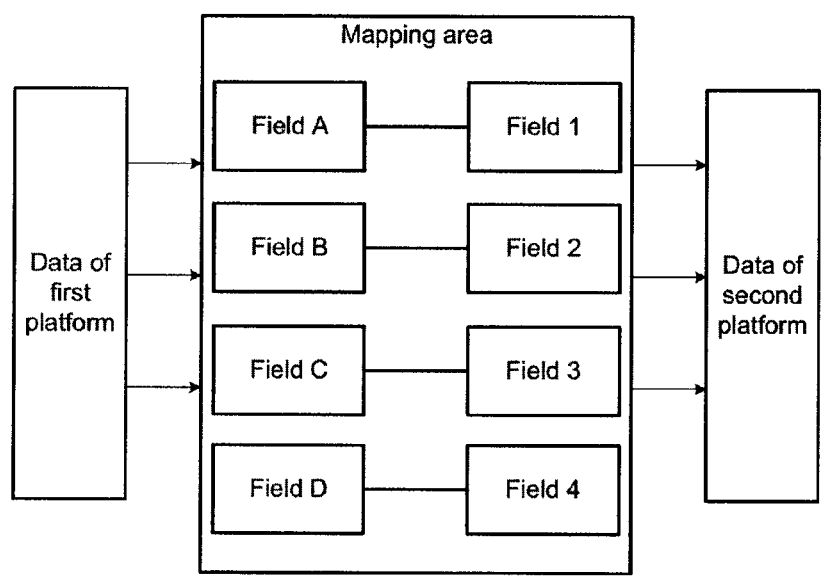
FIG. 3(A) is a simplified diagram showing a field mapping table for data migration according to one embodiment of the present invention.

FIG. 3(A) is a simplified diagram showing a field mapping table for data migration according to one embodiment of the present invention. The diagram is merely an example, which should not unduly limit the scope of the claims. One of ordinary skill in the art would recognize many variations, alternatives, and modifications. As shown in FIG. 3(A), the field mapping table records the mapping between the data structure fields of the data of the first platform and the data of the second platform, in some embodiments. For example, field. A of the first platform corresponds to field 1 of the second platform, and field B of the first platform corresponds to field 2 of the second platform.

Referring back to FIG. 2, after the data packet of the first platform is acquired, the data packet is parsed to acquire the data structure field of the data packet so that the first field mapping table is searched according to the acquired data structure field and determine if the first platform and the second platform have identical or similar data structures, in some embodiments. That is, if the first platform and the second platform have matching data structures. For example, if the first platform and the second platform have matching data structures, data migration between the first platform and the second platform is suitable. That the first platform and the second platform have identical or similar data structures can be used as a basis for subsequent matching determinations, in certain embodiments. As an example, if the first field mapping table does not have a data structure field of the second platform corresponding to the acquired data structure filed of the first platform, it is determined that the matching process fails. An indication of the matching failure may be provided to a user that data migration cannot be achieved, for example. In certain embodiments, other approaches can be used for data migration.

In one embodiment, the process S104 includes: in response to the data structure fields of the data packet being matched with the predetermined first field mapping table, associating (e.g., matching and associating) the data packet with a second platform using one or more predetermined association rules. For example, upon success of the matching process, the data packet of the first platform can be matched and associated with the second platform through automatic matching or through automatic matching and manual matching so as to realize smooth migration of commodity data between different fields, thus increasing data migration efficiency and reducing the user operation costs. As an example, automatic matching may include similarity matching, data modeling and user operation memory, which are expected to intelligently handle the smooth migration of commodity data between different fields when different platforms have different data structures, category structures and property structures. In another example, the category structure and the property structure form a hierarchy, where the category structure goes above the property structure. The category structure includes various sub-categories or property fields under the commodity category field, and the property structure includes various property data of the commodity, e.g. cell phone models under the cell phone category, according to some embodiments.

In another embodiment, the process S105 includes: converting the data packet based at least in part on the association of the data packet and the second platform and migrating the converted data packet to the second platform. For example, after matching and associating the data packet of the first platform with the second platform, the data packet is converted and migrated to the second platform according to the association result.

FIG. 3(B) is a simplified diagram showing an interface for data migration according to one embodiment of the present invention. The diagram is merely an example, which should not unduly limit the scope of the claims. One of ordinary skill in the art would recognize many variations, alternatives, and modifications.

According to one embodiment, as a data packet may include commodities of different categories, a batch processing can be used for data migration. For instance, a category with most commodities can be processed first. Then another category with second most commodities can be processed, and so on until all data are migrated, in some embodiments.

Figure 4A:
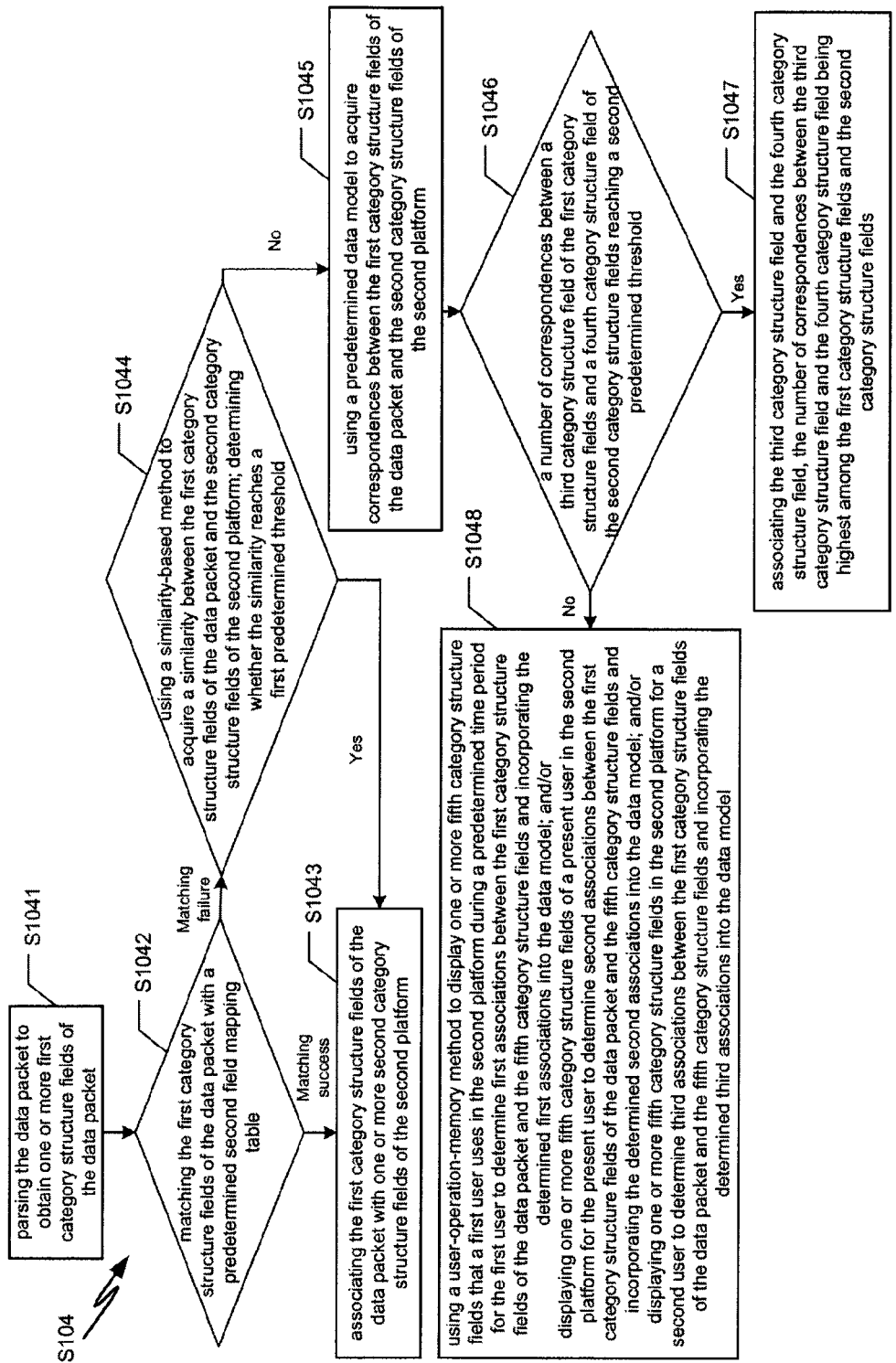
FIG. 4(A) is a simplified diagram showing an association process as part of the method for data migration as shown in FIG. 2 according to one embodiment of the present invention.

FIG. 4(A) is a simplified diagram showing an association process as part of the method for data migration as shown in FIG. 2 according to one embodiment of the present invention. The diagram is merely an example, which should not unduly limit the scope of the claims. One of ordinary skill in the art would recognize many variations, alternatives, and modifications. The process S104 includes at least processes S1041-S1048.

According to one embodiment, the process S1041 includes parsing the data packet to obtain one or more category structure fields of the data packet. For example, the process S1042 includes matching the category structure fields of the data packet with a predetermined second field mapping table. As an example, if the category structure fields of the data packet can be matched with the predetermined second field mapping table, the process S1043 is executed. As another example, if the category structure fields of the data packet cannot be matched with the predetermined second field mapping table, the process S1044 is executed.

According to another embodiment, the process S1043 includes associating the matching category structure fields of the data packet with one or more corresponding category structure fields of the second platform. For example, the process S1044 includes using a similarity-based method to acquire the similarity between the category structure fields of the data packet and the corresponding category structure fields of the second platform. It is determined if the similarity reaches a first predetermined threshold. As an example, in response to the similarity reaching the first predetermined threshold, the process S1043 is executed. Otherwise, the process S1045 is executed.

According to yet another embodiment, the process S1045 includes using a data model established in advance to acquire a number of associations between the category structure fields of the data packet and the corresponding category structure fields of the second platform. For example, the process S1046 includes determining if the highest number of associations between the category structure fields of the data packet and the corresponding category structure fields of the second platform reaches a predetermined second threshold. As an example, if the highest number of associations reaches the predetermined second threshold, the process S1047 is executed. Otherwise, the process S1048 is executed.

In one embodiment, the process S1047 includes associating the two category structure fields that have the highest number of associations provided that such a number reaches the second predetermined threshold. For example, the process S1048 includes using a user-operation-memory method to display to a user the category structure fields that the user uses in the second platform during a latest predetermined time period for the user to choose associations and writing the association records into the data model. In another example, the process S1048 includes displaying the category structure fields of a present user in the second platform for the user to choose associations and writing the association records into the data model. In yet another example, the process S1048 includes displaying all the category structure fields in the second platform for a user to choose the associations and writing the association records into the data model. Specifically, in order to realize the matching and association between different category structure fields, the mapping between the commodity data category fields of the first platform and the second platform is configured in advance, hence generating the second field mapping table, in some embodiments.

In certain embodiments, for the purpose of matching and association between different category structure fields, the data packet of the first platform is parsed in order to acquire one or more category structure fields of the data packet. Then the category structure fields of the data packet are matched with the predetermined second field mapping table and it is determined if mapping already exists between the commodity category fields in the data packet and the current second platform. If the mapping already exists, the matching is successfully done. For example, the matching category structure fields in the data packet are associated with the corresponding category structure fields of the second platform upon success of the matching. Upon failure of the matching, one or more commodity category fields in the data packet of the first platform are matched with the corresponding commodity category fields of the second platform using the following method, in some embodiments: using the similarity matching method to verify if the similarity between any category structure field of the second platform and the category structure field in the data packet reaches the first threshold set for the second platform. If the similarity reaches the first threshold, the matching category structure field in the data packet is associated with the corresponding category structure field of the second platform. For example, data modeling or manual matching can be used to match and associate the different category structure fields of two different platforms.

Figure 4B:
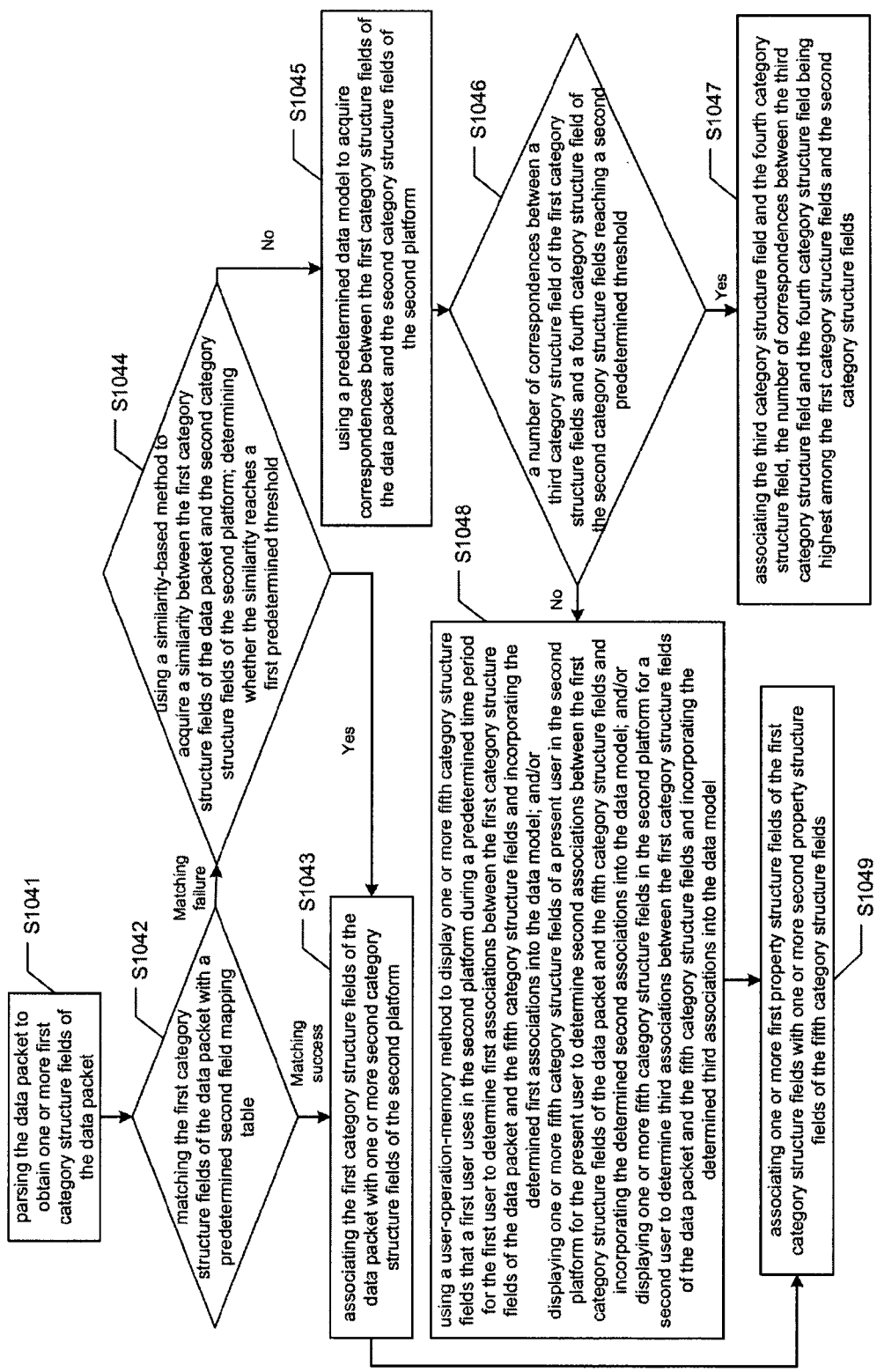
FIG. 4(B) is a simplified diagram showing an association process as part of the method for data migration as shown in FIG. 2 according to another embodiment of the present invention.

In certain embodiments, if the similarity between the category structure field of the data packet and the corresponding category structure field in the second platform acquired using the similarity-based method does not reach the first predetermined threshold, the data model established in advance may be used to match and associate the different category structure fields between the two platforms. For instance, the number of associations between the commodity category field A in the data packet selected by a user of the first platform and field B of the second platform is recorded. If this number of associations reaches the second predetermined threshold set for the second platform and is higher than the number of associations between commodity category field A and any other fields of the second platform, the two fields are associated automatically. The data model is established according to the foregoing principle in advance, which is then used to match and associate different category structure fields of two platforms, in some embodiments. As an example, if the number of associations does not reach the second threshold set for the second platform, another method, e.g. a user-operation-memory method or a manual matching method, may be used to match and associate different category structure fields between two platforms. Specifically, the user-operation-memory method, for example, may be used to display one or more frequently used categories recently for the user to choose the associations and write the association records into the data model automatically. Thereafter, the updated data model can be used to match and associate the different category structure fields of two platforms, in some embodiments. In another example, categories of a user shop may be displayed to the user for selection and the association records can be automatically kept in the data model. Thereafter, the updated data model can be used to match and associate the different category structure fields of two platforms, in some embodiments. In yet another example, all the categories on the platform may be displayed to the user for selection and the association records can be automatically kept in the data model. Thereafter, the updated data model can be used to match and associate the different category structure fields of two platforms, in certain embodiments. 100401 FIG. 4(B) is a simplified diagram showing an association process as part of the method for data migration as shown in FIG. 2 according to another embodiment of the present invention. The diagram is merely an example, which should not unduly limit the scope of the claims. One of ordinary skill in the art would recognize many variations, alternatives, and modifications. The process S104 further includes a process S1049.

According to one embodiment, the process S1049 includes associating the property structure fields in the associated category structure field. For example, as shown in FIG. 4(B), the process S104 including the process S1049 enables matching and association of different property structure fields of two platforms with reference to the property structure field. As an example, different approaches may be adopted to match and associate different property structure fields, e.g., similarity matching, data modeling, a user-operation-memory method and/or a manual matching method.

Figure 5:
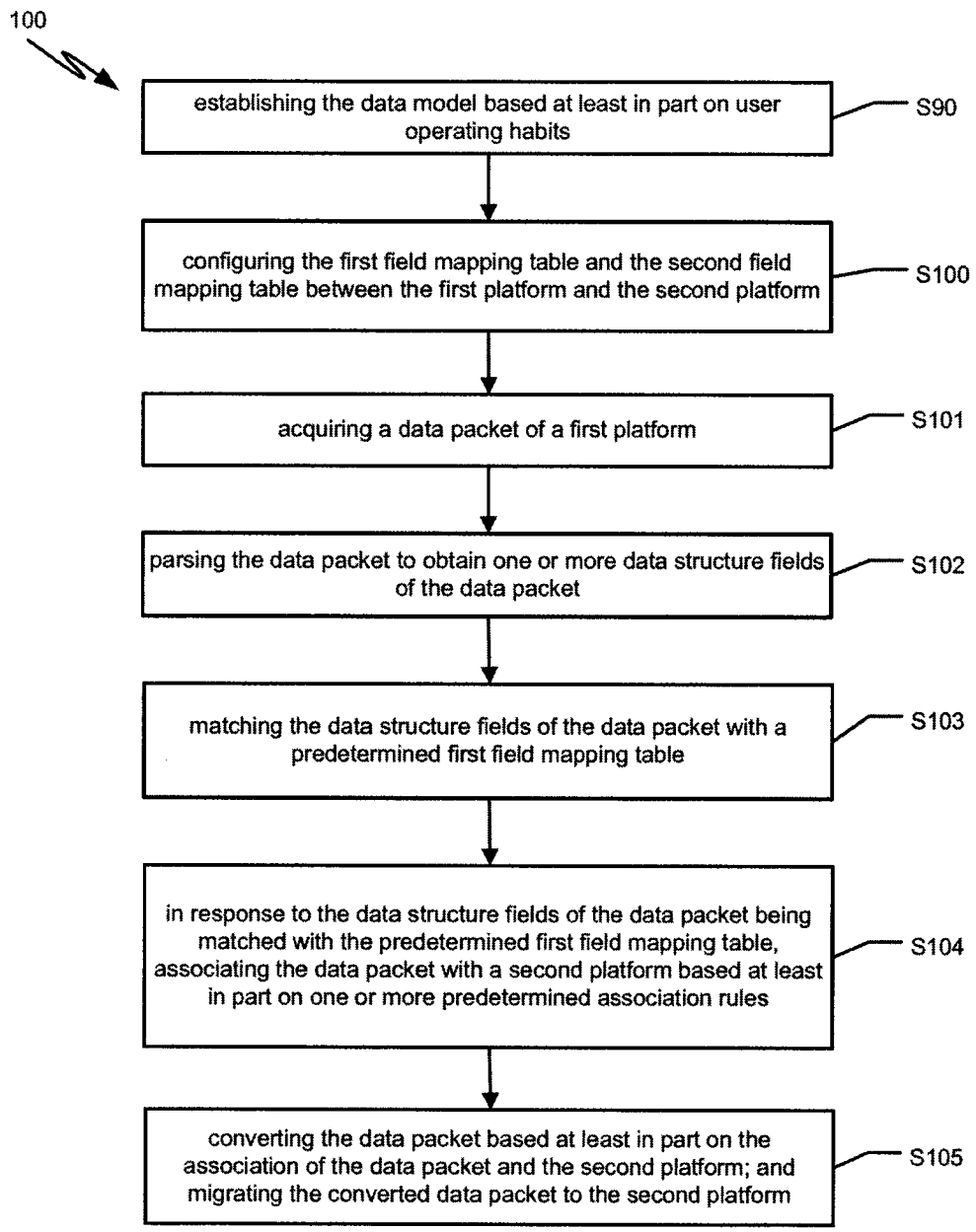
FIG. 5 is a simplified diagram showing a method for data migration according to another embodiment of the present invention.

FIG. 5 is a simplified diagram showing a method for data migration according to another embodiment of the present invention. The diagram is merely an example, which should not unduly limit the scope of the claims. One of ordinary skill in the art would recognize many variations, alternatives, and modifications. The method 100 further includes the processes S90 and S100.

According to one embodiment, the process S90 includes establishing the data model based on the user operating habits. For example, the process S100 includes configuring the first field mapping table and the second field mapping table between the first platform and the second platform. As an example, a user's operating habits or historic operating records may be referenced for the purpose of data modeling. For instance, a number of associations between the commodity category field A in the data packet selected by a user of the first platform and field B of the second platform are recorded. If this number of associations reaches the threshold set for the second platform and is higher than the number of associations between commodity category field A and other fields of the second platform, the two fields are associated automatically, in some embodiments. For example, the data model is established according to the foregoing principle, and then used to match and associate different category structure fields or different property fields of two platforms. This data model may be upgraded through continuous learning thereafter.

According to another embodiment, the first field mapping table records the mapping between the commodity data structure fields of the first platform and the second platform. For example, the second field mapping table records the mapping between the commodity category structure fields of the first platform and the second platform. The first field mapping table and the second field mapping table may be established according to the user's selection or practical experiences and are taken as the criteria for matching and associating the data packet of the first platform with the second platform, in some embodiments. For example, the process S90 and the process S100 may be implemented before the process S102 or between the process S102 and the process S103.

Figure 6:
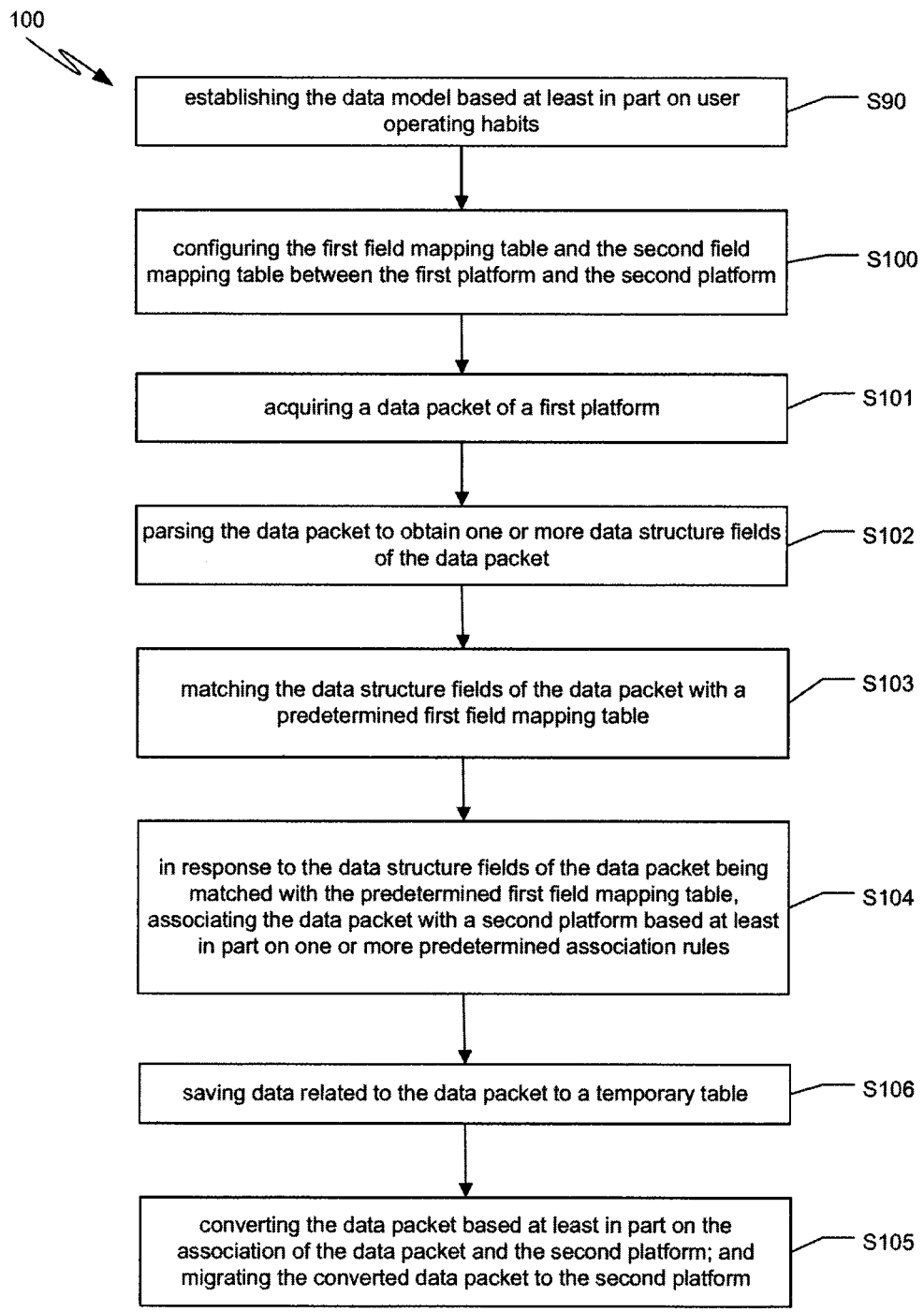
FIG. 6 is a simplified diagram showing a method for data migration according to yet another embodiment of the present invention.

FIG. 6 is a simplified diagram showing a method for data migration according to yet another embodiment of the present invention. The diagram is merely an example, which should not unduly limit the scope of the claims. One of ordinary skill in the art would recognize many variations, alternatives, and modifications. The method 100 further includes the process S106.

According to one embodiment, the process S106 includes saving the data in the associated data packet to a temporary table. For example, the data packet may be migrated to the second platform according to the following: acquiring the associated data from the temporary table according to the association between the data packet and the second platform, and migrating the associated data to the second platform. As an example, the data in the associated data packet is saved to the temporary table after the data packet is matched and associated with the second platform according to the predetermined association rules. After the matching and association of all data in the data packet of the first platform, the associated data is acquired from the temporary table and migrated to the second platform, hence ensuring the integrity and accuracy of the migrated data.

Figure 7:
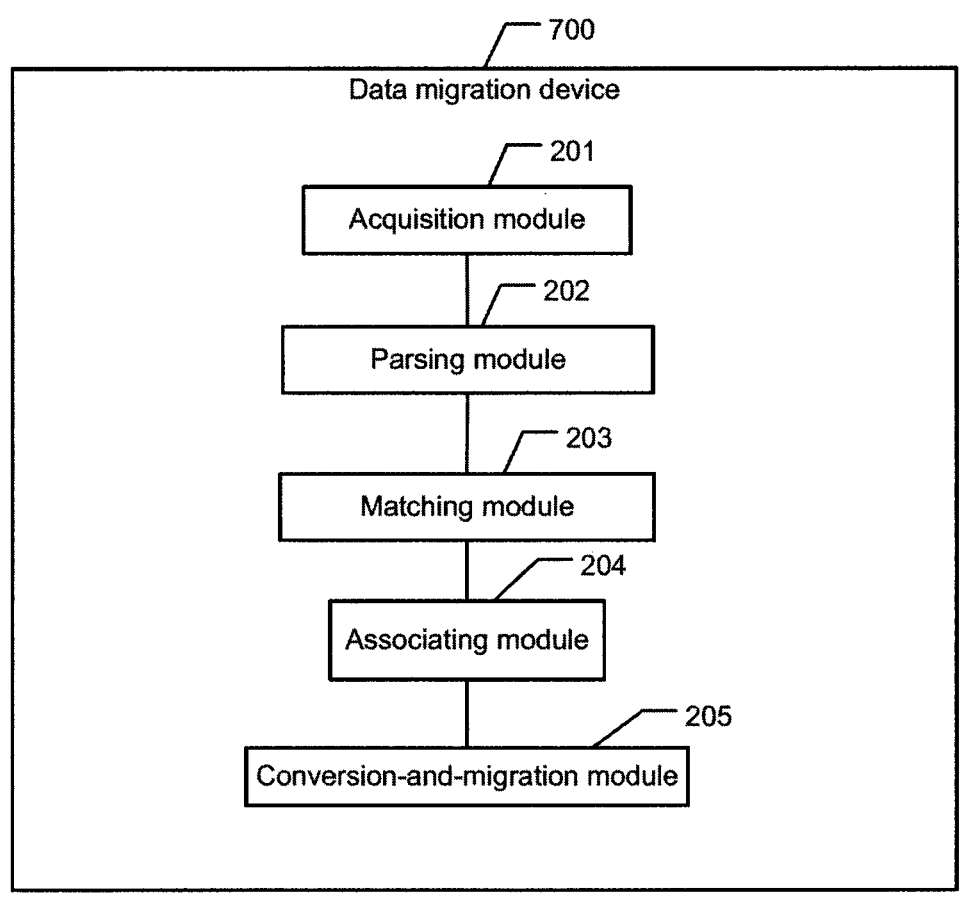
FIG. 7 is a simplified diagram showing a device for data migration according to one embodiment of the present invention.

FIG. 7 is a simplified diagram showing a device for data migration according to one embodiment of the present invention. The diagram is merely an example, which should not unduly limit the scope of the claims. One of ordinary skill in the art would recognize many variations, alternatives, and modifications. The device 700 includes an acquisition module 201, a parsing module 202, a matching module 203, an associating module 204 and a conversion-and-migration module 205.

According to one embodiment, the acquisition module 201 is configured to acquire a data packet of a first platform. For example, the parsing module 202 is configured to parse the data packet to obtain one or more data structure fields of the data packet. As an example, the matching module 203 is configured to match the data structure fields of the data packet with a predetermined first field mapping table. In another example, the associating module 204 is configured to, in response to the data structure fields of the data packet being matched with the predetermined first field mapping table, associate the data packet with a second platform based at least in part on one or more predetermined association rules. In yet another example, the conversion-and-migration module 205 is configured to convert the data packet based at least in part on the association of the data packet and the second platform and migrate the converted data packet to the second platform. The device 700 is mounted on a first platform or on a second platform or independent from both the first platform and the second platform, in some embodiments.

According to another embodiment, the acquisition module 201 uploads the data packet of the first platform onto the second platform on which the user is operating presently, wherein the data packet of the first platform can be directly selected and acquired from the first platform or the background server. For example, the data structure, as in an E-commerce platform for instance, includes the category field, name field and other suitable information of the commodity. For instance, a data structure includes the following data structure fields: category name, commodity name and commodity price. As different platforms may have different data structure fields, the mapping between the commodity data structure fields of the first platform and the second platform is configured in advance and the first field mapping table is hence created (e.g., as shown in FIG. 3(A)), in order to realize the smooth migration of data between different data structures, according to certain embodiments. This first field mapping table records the mapping between the data structure fields of the data of the first platform and the second platform. For example in FIG. 3(A), field A of the first platform corresponds to field 1 of the second platform.

According to yet another embodiment, after the data packet of the first platform is acquired, the parsing module 202 parses the data packet to acquire the data structure field of this data packet so that the matching module 203 searches the first field mapping table according to this data structure field and determines if the first platform and the second platform have identical or similar data structures. That is, if the first platform and the second platform have the matching data structures is determined. If yes, the first platform and the second platform are deemed to have identical or similar data structures and data migration between the first platform and the second platform is suitable. That the first platform and the second platform have identical or similar data structures can be used as a basis for subsequent matching determinations, in certain embodiments. As an example, if the first field mapping table does not have a data structure field of the second platform corresponding to the acquired data structure filed of the first platform, it is determined that the matching process fails. An indication of the matching failure may be provided to a user that data migration cannot be achieved, for example. In certain embodiments, other approaches can be used for data migration.

In one embodiment, upon success of the matching, the associating module 204 matches and associates the data packet with a second platform using predetermined matching and association rules. Specifically, the data packet of the first platform can be matched and associated with the second platform through automatic matching or through automatic matching and manual matching so as to realize smooth migration of commodity data between different fields, thus increasing data migration efficiency and reducing the user operating cost. As an example, automatic matching may include similarity matching, data modeling and user operation memory, which are expected to intelligently handle the smooth migration of commodity data between different fields when different platforms have different data structures, category structures and property structures. In another example, the category structure and the property structure form a hierarchy, where the category structure goes above the property structure. The category structure includes various sub-categories or property fields under the commodity category field, and the property structure includes various property data of the commodity, e.g. cell phone models under the cell phone category, according to some embodiments.

In another embodiment, after matching and association of the data packet of the first platform with the second platform, the conversion-and-migration module 205 converts and migrates the data packet to the second platform according to the association results. As shown in FIG. 3(B), as a data packet may include commodities of different categories, a batch processing can be used for data migration. For instance, a category with most commodities can be processed first. Then another category with second most commodities can be processed, and so on until all data are migrated, in some embodiments.

Figure 8:
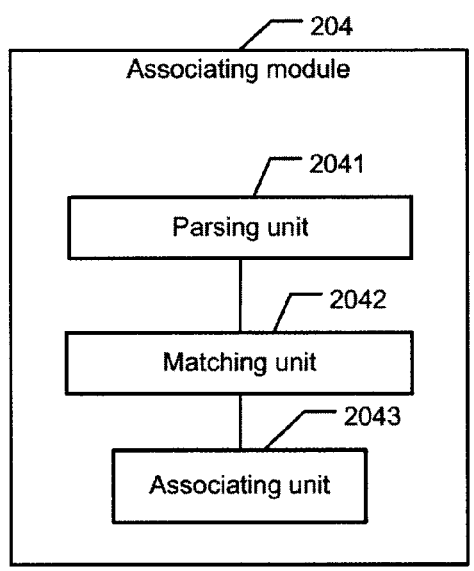
FIG. 8 is a simplified diagram showing an associating module as part of the device as shown in FIG. 7 according to one embodiment of the present invention.

FIG. 8 is a simplified diagram showing an associating module as part of the device as shown in FIG. 7 according to one embodiment of the present invention. The diagram is merely an example, which should not unduly limit the scope of the claims. One of ordinary skill in the art would recognize many variations, alternatives, and modifications. The associating module 204 includes: a parsing unit 2041, a matching unit 2042 and an associating unit 2043.

According to one embodiment, the parsing unit 2041 is configured to parse the data packet to obtain one or more first category structure fields of the data packet. For example, the matching unit 2042 is configured to match the first category structure fields of the data packet with a predetermined second field mapping table. In another example, the associating unit 2043 is configured to: in response to the first category structure fields of the data packet being matched with the predetermined second field mapping table, associate the first category structure fields of the data packet with one or more second category structure fields of the second platform. In addition, the associating unit 2043 is further configured to, in response to the first category structure fields of the data packet not being matched with the predetermined second field mapping table, use a similarity-based method to acquire a similarity between the first category structure fields of the data packet and the second category structure fields of the second platform, determine whether the similarity reaches a first predetermined threshold, and in response to the similarity reaching the first predetermined threshold, associate the first category structure fields of the data packet with the second category structure fields of the second platform.

According to another embodiment, the associating unit 2043 is also configured to: in response to the similarity not reaching the first predetermined threshold, use a predetermined data model to acquire correspondences between the first category structure fields of the data packet and the second category structure fields of the second platform; and in response to a number of correspondences between a third category structure field of the first category structure fields and a fourth category structure field of the second category structure fields reaching a second predetermined threshold, associate the third category structure field and the fourth category structure field, the number of correspondences between the third category structure field and the fourth category structure field being highest among the first category structure fields and the second category structure fields.

According to yet another embodiment, the associating unit 2043 is also configured to, in response to the correspondences between the first category structure fields of the data packet and the second category structure fields of the second platform not reaching the second predetermined threshold, use a user-operation-memory method to display one or more fifth category structure fields that a first user uses in the second platform during a predetermined time period for the first user to determine first associations between the first category structure fields of the data packet and the fifth category structure fields; and incorporate the determined first associations into the data model.

According to yet another embodiment, the associating unit 2043 is also configured to: (e.g., in response to the correspondences between the first category structure fields of the data packet and the second category structure fields of the second platform not reaching the second predetermined threshold) display one or more fifth category structure fields of a present user in the second platform for the present user to determine second associations between the first category structure fields of the data packet and the fifth category structure fields; and incorporate the determined second associations into the data model.

According to yet another embodiment, the associating unit 2043 is also configured to: (e.g., in response to the correspondences between the first category structure fields of the data packet and the second category structure fields of the second platform not reaching the second predetermined threshold) display one or more fifth category structure fields in the second platform for a second user to determine third associations between the first category structure fields of the data packet and the fifth category structure fields; and incorporate the determined third associations into the data model.

In one embodiment, the associating unit 2043 is also configured to associate one or more first property structure fields of the first category structure fields with one or more second property structure fields of the fifth category structure fields. Specifically, in order to realize the matching and association between different category structure fields, the mapping between the commodity data category fields of the first platform and the second platform is configured in advance to generate the second field mapping table.

In certain embodiments, for the purpose of matching and association between different category structure fields, the data packet of the first platform is parsed in order to acquire one or more category structure fields of the data packet. Then the category structure fields of the data packet are matched with the predetermined second field mapping table and it is determined if mapping already exists between the commodity category fields in the data packet and the current second platform. If the mapping already exists, the matching is successfully done. For example, the matching category structure fields in the data packet are associated with the corresponding category structure fields of the second platform upon success of the matching. Upon failure of the matching, one or more commodity category fields in the data packet of the first platform are matched with the corresponding commodity category fields of the second platform using the following method, in some embodiments: using the similarity matching method to verify if the similarity between any category structure field of the second platform and the category structure field in the data packet reaches the first threshold set for the second platform. If the similarity reaches the first threshold, the matching category structure field in the data packet is associated with the corresponding category structure field of the second platform. For example, data modeling or manual matching can be used to match and associate the different category structure fields of two different platforms.

In certain embodiments, if the similarity between the category structure field of the data packet and the corresponding category structure field in the second platform acquired using the similarity-based method does not reach the first predetermined threshold, the data model established in advance may be used to match and associate the different category structure fields between the two platforms. For instance, the number of associations between the commodity category field A in the data packet selected by a user of the first platform and field B of the second platform is recorded. If this number of associations reaches the second predetermined threshold set for the second platform and is higher than the number of associations between commodity category field A and any other fields of the second platform, the two fields are associated automatically. The data model is established according to the foregoing principle in advance, which is then used to match and associate different category structure fields of two platforms, in some embodiments. As an example, if the number of associations does not reach the second threshold set for the second platform, another method, e.g. a user-operation-memory method or a manual matching method, may be used to match and associate different category structure fields between two platforms. Specifically, the user-operation-memory method, for example, may be used to display one or more frequently used categories recently for the user to choose the associations and write the association records into the data model automatically. Thereafter, the updated data model can be used to match and associate the different category structure fields of two platforms, in some embodiments. In another example, categories of a user shop may be displayed to the user for selection and the association records can be automatically kept in the data model. Thereafter, the updated data model can be used to match and associate the different category structure fields of two platforms, in some embodiments. In yet another example, all the categories on the platform may be displayed to the user for selection and the association records can be automatically kept in the data model. Thereafter, the updated data model can be used to match and associate the different category structure fields of two platforms, in certain embodiments. For example, it is possible to match and associate different property structure fields of two platforms with reference to the property structure field. As an example, different approaches may be adopted to match and associate different property structure fields, e.g., similarity matching, data modeling, a user-operation-memory method and/or a manual matching method.

Figure 9:
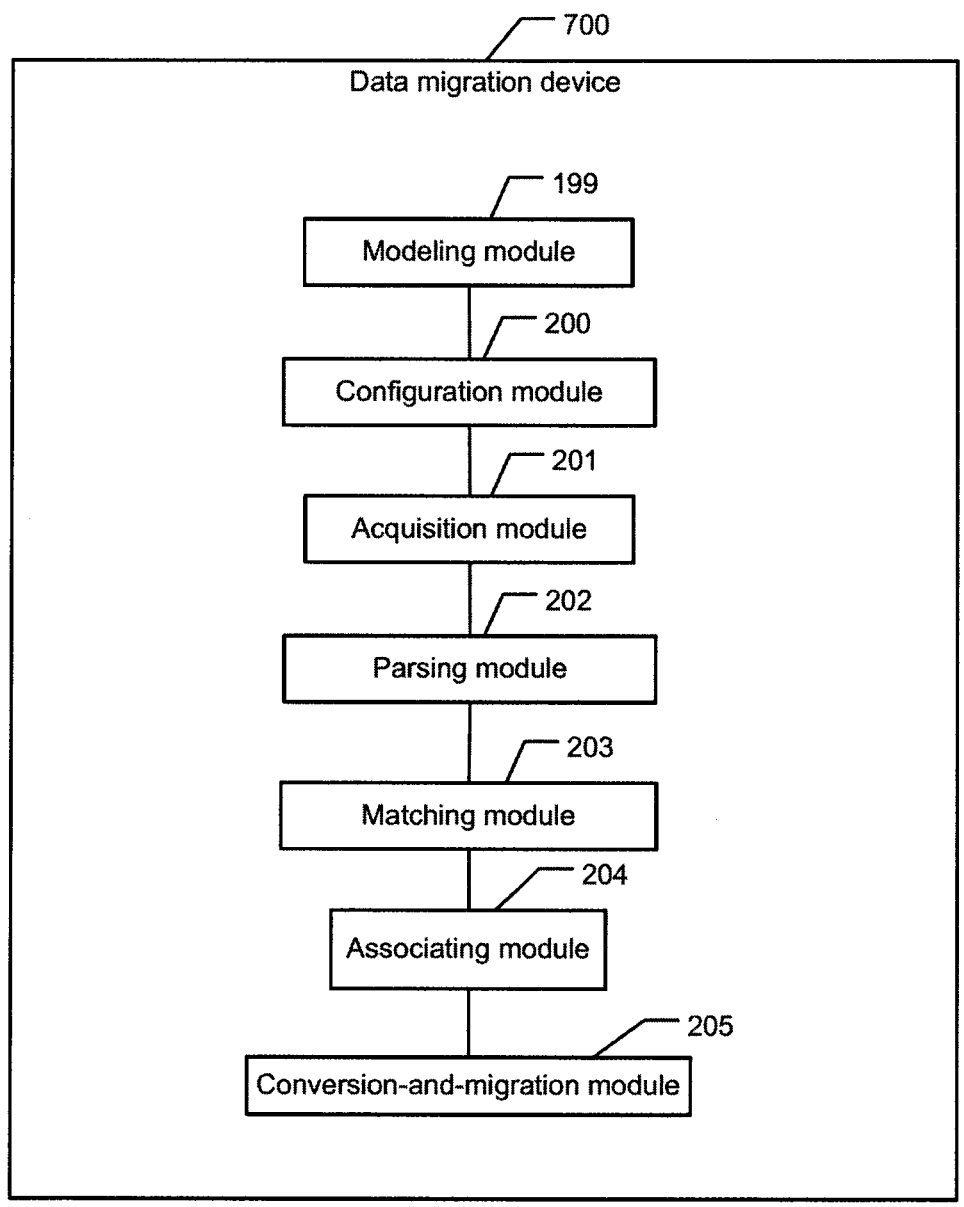
FIG. 9 is a simplified diagram showing a device for data migration according to yet another embodiment of the present invention.

FIG. 9 is a simplified diagram showing a device for data migration according to yet another embodiment of the present invention. The diagram is merely an example, which should not unduly limit the scope of the claims. One of ordinary skill in the art would recognize many variations, alternatives, and modifications.

According to one embodiment, the device 700 further includes: a modeling module 199 configured to establish a data model based on user operation habits, and a configuring module 200 configured to configure a first field mapping table and a second field mapping table between the first platform and a second platform. For example, the first field mapping table and the second field mapping table are configured between the first platform and the second platform. As an example, a user's operating habits or historic operating records may be referenced for the purpose of data modeling. For instance, a number of associations between the commodity category field A in the data packet selected by a user of the first platform and field B of the second platform are recorded. If this number of associations reaches the threshold set for the second platform and is higher than the number of associations between commodity category field A and other fields of the second platform, the two fields are associated automatically, in some embodiments. For example, the data model is established according to the foregoing principle, and then used to match and associate different category structure fields or different property fields of two platforms. This data model may be upgraded through continuous learning thereafter.

According to another embodiment, the first field mapping table records the mapping between the commodity data structure fields of the first platform and the second platform. For example, the second field mapping table records the mapping between the commodity category structure fields of the first platform and the second platform. The first field mapping table and the second field mapping table may be established according to the user's selection or practical experiences and are taken as the criteria for matching and associating the data packet of the first platform with the second platform, in some embodiments. In certain embodiments, the modeling module 199 and the configuring module 200 are connected differently from what is shown in FIG. 9.

According to yet another embodiment, a method is provided for data migration. For example, a data packet of a first platform is acquired; the data packet is parsed to obtain one or more data structure fields of the data packet; the data structure fields of the data packet are matched with a predetermined first field mapping table; in response to the data structure fields of the data packet being matched with the predetermined first field mapping table, the data packet is associated with a second platform based at least in part on one or more predetermined association rules; the data packet is converted based at least in part on the association of the data packet and the second platform; and the converted data packet is migrated to the second platform. For example, the method is implemented according to at least FIG. 2, FIG. 5, and/or FIG. 6.

According to another embodiment, a device for data migration includes: an acquisition module configured to acquire a data packet of a first platform; a parsing module configured to parse the data packet to obtain one or more data structure fields of the data packet; a matching module configured to match the data structure fields of the data packet with a predetermined first field mapping table; an associating module configured to, in response to the data structure fields of the data packet being matched with the predetermined first field mapping table, associate the data packet with a second platform based at least in part on one or more predetermined association rules; and a conversion-and-migration module configured to convert the data packet based at least in part on the association of the data packet and the second platform and migrate the converted data packet to the second platform. For example, the device is implemented according to at least FIG. 7, FIG. 8, and/or FIG. 9.

According to yet another embodiment, a non-transitory computer readable storage medium includes programming instructions for data migration. The programming instructions are configured to cause one or more data processors to execute certain operations. For example, a data packet of a first platform is acquired; the data packet is parsed to obtain one or more data structure fields of the data packet; the data structure fields of the data packet are matched with a predetermined first field mapping table; in response to the data structure fields of the data packet being matched with the predetermined first field mapping table, the data packet is associated with a second platform based at least in part on one or more predetermined association rules; the data packet is converted based at least in part on the association of the data packet and the second platform; and the converted data packet is migrated to the second platform. For example, the storage medium is implemented according to at least FIG. 2, FIG. 5, and/or FIG. 6.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method for data migration, the method comprising:
acquiring a data packet of a first platform;
parsing the data packet to obtain one or more data structure fields of the data packet;
matching the one or more data structure fields of the data packet with a predetermined first field mapping table;
in response to the one or more data structure fields of the data packet being matched with the predetermined first field mapping table, associating the data packet with a second platform based at least in part on one or more predetermined association rules;
converting the data packet based at least in part on the association of the data packet and the second platform; and
migrating the converted data packet to the second platform,
wherein the associating the data packet with the second platform based at least in part on one or more predetermined association rules includes:
parsing the data packet to obtain one or more first category structure fields of the data packet;
matching the one or more first category structure fields of the data packet with a predetermined second field mapping table;
in response to the one or more first category structure fields of the data packet being matched with the predetermined second field mapping table, associating the one or more first category structure fields of the data packet with one or more second category structure fields of the second platform;
in response to the one or more first category structure fields of the data packet not being matched with the predetermined second field mapping table, using a similarity-based method to acquire a similarity between the one or more first category structure fields of the data packet and the one or more second category structure fields of the second platform;
determining whether the similarity reaches a first predetermined threshold; and
in response to the similarity reaching the first predetermined threshold, associating the one or more first category structure fields of the data packet with the one or more second category structure fields of the second platform.

2. The method of claim 1, wherein the associating the data packet with the second platform based at least in part on one or more predetermined association rules further includes:
in response to the similarity not reaching the first predetermined threshold, using a predetermined data model to acquire correspondences between the one or more first category structure fields of the data packet and the one or more second category structure fields of the second platform; and
in response to a number of correspondences between a third category structure field of the one or more first category structure fields and a fourth category structure field of the one or more second category structure fields reaching a second predetermined threshold, associating the third category structure field and the fourth category structure field, the number of correspondences between the third category structure field and the fourth category structure field being highest among the one or more first category structure fields and the one or more second category structure fields.

3. The method of claim 2, wherein the associating the data packet with the second platform based at least in part on one or more predetermined association rules further includes:
in response to the correspondences between the one or more first category structure fields of the data packet and the one or more second category structure fields of the second platform not reaching the second predetermined threshold,
using a user-operation-memory method to display one or more fifth category structure fields that a first user uses in the second platform during a predetermined time period for the first user to determine one or more first associations between the one or more first category structure fields of the data packet and the one or more fifth category structure fields; and
incorporating the determined one or more first associations into the data model.

4. The method of claim 3, wherein the associating the data packet with the second platform based at least in part on one or more predetermined association rules further includes:
associating one or more first property structure fields of the one or more first category structure fields with one or more second property structure fields of the one or more fifth category structure fields.

5. The method of claim 2, wherein the associating the data packet with the second platform based at least in part on one or more predetermined association rules further includes:
in response to the correspondences between the one or more first category structure fields of the data packet and the one or more second category structure fields of the second platform not reaching the second predetermined threshold,
displaying one or more fifth category structure fields of a present user in the second platform for the present user to determine one or more second associations between the one or more first category structure fields of the data packet and the one or more fifth category structure fields; and incorporating the determined one or more second associations into the data model.

6. The method of claim 2, wherein the associating the data packet with the second platform based at least in part on one or more predetermined association rules further includes:

in response to the correspondences between the one or more first category structure fields of the data packet and the one or more second category structure fields of the second platform not reaching the second predetermined threshold, displaying one or more fifth category structure fields in the second platform for a second user to determine one or more third associations between the one or more first category structure fields of the data packet and the one or more fifth category structure fields; and incorporating the determined one or more third associations into the data model.

7. The method of claim 2, further comprising:
establishing the data model based at least in part on user operating habits.

8. The method of claim 1, further comprising:
configuring the first field mapping table and the second field mapping table between the first platform and the second platform.

9. The method of claim 1, wherein the migrating the converted data packet to the second platform includes:
migrating category data related to the data packet to the second platform in batches based at least in part on the association of the data packet and the second platform.

10. The method of claim 1, further comprising:
saving data related to the data packet to a temporary table;
the migrating the converted data packet to the second platform includes:
acquiring the data related to the data packet from the temporary table based at least in part on the association of the data packet and the second platform; and
migrating the data related to the data packet to the second platform.

11. A device for data migration comprising:
an acquisition module configured to acquire a data packet of a first platform;
a parsing module configured to parse the data packet to obtain one or more data structure fields of the data packet;
a matching module configured to match the one or more data structure fields of the data packet with a predetermined first field mapping table;
an associating module configured to, in response to the one or more data structure fields of the data packet being matched with the predetermined first field mapping table, associate the data packet with a second platform based at least in part on one or more predetermined association rules; and
a conversion-and-migration module configured to convert the data packet based at least in part on the association of the data packet and the second platform and migrate the converted data packet to the second platform, wherein the associating module includes:
a parsing unit configured to parse the data packet to obtain one or more first category structure fields of the data packet;

a matching unit configured to match the one or more first category structure fields of the data packet with a predetermined second field mapping table; and an associating unit configured to:
in response to the one or more first category structure fields of the data packet being matched with the predetermined second field mapping table, associate the one or more first category structure fields of the data packet with one or more second category structure fields of the second platform;
in response to the one or more first category structure fields of the data packet not being matched with the predetermined second field mapping table,
use a similarity-based method to acquire a similarity between the one or more first category structure fields of the data packet and the one or more second category structure fields of the second platform;
determine whether the similarity reaches a first predetermined threshold; and
in response to the similarity reaching the first predetermined threshold, associate the one or more first category structure fields of the data packet with the one or more second category structure fields of the second platform.

12. The device of claim 11, wherein the associating unit is further configured to:
in response to the similarity not reaching the first predetermined threshold, use a predetermined data model to acquire correspondences between the one or more first category structure fields of the data packet and the one or more second category structure fields of the second platform; and
in response to a number of correspondences between a third category structure field of the one or more first category structure fields and a fourth category structure field of the one or more second category structure fields reaching a second predetermined threshold, associate the third category structure field and the fourth category structure field, the number of correspondences between the third category structure field and the fourth category structure field being highest among the one or more first category structure fields and the one or more second category structure fields.

13. The device of claim 12, wherein the associating unit is further configured to:
in response to the correspondences between the one or more first category structure fields of the data packet and the one or more second category structure fields of the second platform not reaching the second predetermined threshold,
use a user-operation-memory method to display one or more fifth category structure fields that a first user uses in the second platform during a predetermined time period for the first user to determine one or more first associations between the one or more first category structure fields of the data packet and the one or more fifth category structure fields; and
incorporate the determined one or more first associations into the data model.

14. The device of claim 13, wherein the associating unit is further configured to associate one or more first property structure fields of the one or more first category structure fields with one or more second property structure fields of the one or more fifth category structure fields.

15. The device of claim 14, wherein the associating unit is further configured to:

in response to the correspondences between the one or more first category structure fields of the data packet and the one or more second category structure fields of the second platform not reaching the second predetermined threshold,
display one or more fifth category structure fields of a present user in the second platform for the present user to determine one or more second associations between the one or more first category structure fields of the data packet and the one or more fifth category structure fields; and
incorporate the determined one or more second associations into the data model.

16. The device of claim 14, wherein the associating unit is further configured to:
in response to the correspondences between the one or more first category structure fields of the data packet and the one or more second category structure fields of the second platform not reaching the second predetermined threshold,
display one or more fifth category structure fields in the second platform for a second user to determine one or more third associations between the one or more first category structure fields of the data packet and the one or more fifth category structure fields; and
incorporate the determined one or more third associations into the data model.

17. The device of claim 14, further comprising:
a modeling module configured to establish the data model based at least in part on user operating habits.

18. The device of claim 12, further comprising:
a configuring module configured to configure the first field mapping table and the second field mapping table between the first platform and the second platform.

19. The device of claim 12, wherein the conversion-and-migration module is further configured to migrate category data related to the data packet to the second platform in batches based at least in part on the association of the data packet and the second platform.

20. The device of claim 12, wherein:
the associating module is further configured to save data related to the data packet to a temporary table; and
the conversion-and-migration module is further configured to:
acquire the data related to the data packet from the temporary table based at least in part on the association of the data packet and the second platform; and
migrate the data related to the data packet to the second platform.

21. The device of claim 12, further comprising:
one or more data processors; and
a computer-readable storage medium;
wherein the acquisition module, the parsing module, the associating module, and the conversion-and-migration module are stored in the storage medium and configured to be executed by the one or more data processors.

22. A non-transitory computer readable storage medium comprising programming instructions for data migration, the programming instructions configured to cause one or more data processors to execute operations comprising:
acquiring a data packet of a first platform;
parsing the data packet to obtain one or more data structure fields of the data packet;
matching the one or more data structure fields of the data packet with a predetermined first field mapping table;
in response to the one or more data structure fields of the data packet being matched with the predetermined first field mapping table, associating the data packet with a second platform based at least in part on one or more predetermined association rules;
converting the data packet based at least in part on the association of the data packet and the second platform; and
migrating the converted data packet to the second platform,
wherein the associating the data packet with a second platform based at least in part on one or more predetermined association rules includes:
parsing the data packet to obtain one or more first category structure fields of the data packet;
matching the one or more first category structure fields of the data packet with a predetermined second field mapping table;
in response to the one or more first category structure fields of the data packet being matched with the predetermined second field mapping table, associating the one or more first category structure fields of the data packet with one or more second category structure fields of the second platform;
in response to the one or more first category structure fields of the data packet not being matched with the predetermined second field mapping table,
using a similarity-based method to acquire a similarity between the one or more first category structure fields of the data packet and the one or more second category structure fields of the second platform;
determining whether the similarity reaches a first predetermined threshold; and
in response to the similarity reaching the first predetermined threshold, associating the one or more first category structure fields of the data packet with the one or more second category structure fields of the second platform.

* * * * *